(12) United States Patent
McLaughlin et al.

(10) Patent No.: US 12,450,899 B2
(45) Date of Patent: Oct. 21, 2025

(54) SENSOR CALIBRATION FOR SPACE TRANSLATION

(71) Applicant: Nvidia Corporation, Santa Clara, CA (US)

(72) Inventors: Evan McLaughlin, Guelph (CA); Farzin Aghdasi, East Palo Alto, CA (US); Milind Naphade, Cupertino, CA (US); Arihant Jain, Fremont, CA (US); Sujit Biswas, San Jose, CA (US); Parthasarathy Sriram, Los Altos Hills, CA (US)

(73) Assignee: Nvidia Corporation, Santa Clara, CA (US)

( * ) Notice: Subject to any disclaimer, the term of this patent is extended or adjusted under 35 U.S.C. 154(b) by 84 days.

(21) Appl. No.: 17/307,688

(22) Filed: May 4, 2021

(65) Prior Publication Data

US 2021/0348938 A1 Nov. 11, 2021

Related U.S. Application Data

(60) Provisional application No. 63/020,538, filed on May 5, 2020.

(51) Int. Cl.
*G06V 20/10* (2022.01)
*G01C 21/34* (2006.01)
*G01C 21/36* (2006.01)
*G06V 20/20* (2022.01)
*G06V 20/54* (2022.01)

(52) U.S. Cl.
CPC ....... *G06V 20/182* (2022.01); *G01C 21/3476* (2013.01); *G01C 21/3614* (2013.01); *G06V 20/20* (2022.01); *G06V 20/54* (2022.01)

(58) Field of Classification Search
None
See application file for complete search history.

(56) References Cited

U.S. PATENT DOCUMENTS

| 2008/0291278 | A1* | 11/2008 | Zhang | G06V 10/245 348/E7.085 |
|---|---|---|---|---|
| 2015/0341629 | A1* | 11/2015 | Zeng | H04N 17/002 348/187 |
| 2017/0039765 | A1* | 2/2017 | Zhou | G06T 7/521 |
| 2017/0221226 | A1* | 8/2017 | Shen | G06T 7/80 |
| 2017/0332203 | A1* | 11/2017 | Nagpal | H04W 4/029 |
| 2019/0122386 | A1* | 4/2019 | Wheeler | G01C 21/1652 |
| 2019/0332893 | A1* | 10/2019 | Roy Chowdhury | G06F 18/2163 |
| 2020/0184259 | A1* | 6/2020 | Viswanathan | G06F 18/22 |
| 2020/0240794 | A1* | 7/2020 | Prasser | G05D 1/0212 |

FOREIGN PATENT DOCUMENTS

WO WO-2019226225 A1 * 11/2019 ............. G01C 25/00

* cited by examiner

*Primary Examiner* — Redhwan K Mawari
*Assistant Examiner* — David Ruben Pedersen
(74) *Attorney, Agent, or Firm* — Hogan Lovells US LLP

(57) ABSTRACT

Calibration of various sensors may be difficult without specialized software to process intrinsic and extrinsic information about the sensors. Certain types of input files, such as image files, may also lack certain information, like depth information, to effectively translate regions of interest between images taken from a different perspective. Landmarks can be used to establish points for associating regions of interest between images taken from a different perspective and provided as an overlay to verify sensor calibration.

9 Claims, 15 Drawing Sheets

SENSOR CALIBRATION FOR SPACE TRANSLATION

CROSS-REFERENCE TO RELATED APPLICATIONS

This application claims priority to and the benefit of U.S. Provisional Patent Application No. 63/020,538, filed May 5, 2020 and titled "CAMERA CALIBRATION FOR INTELLIGENT VIDEO ANALYTICS," the full disclosure of which is hereby incorporated in its entirety for all purposes.

BACKGROUND

Optical sensors, such as video cameras, may be used to monitor a variety of locations and provide data for analytics processing. Various algorithms may be used to process the data to obtain useful information, such as object identification or movement tracking. Using these systems may involve detailed calibration procedures, where sensor information is mapped to a potential scene or view obtained by the sensor. Calibration procedures can be time and resource intensive, as certain intrinsic and extrinsic sensor properties are translated between an image view, obtained by the sensor, and a real world view that includes additional information that the image view may not capture, such as topographical or depth information. Calibration procedures may grow more complex, as multi-sensor systems may all need to be calibrated to try and correspond to overlapping regions. Assuming laboratory conditions and ignoring real world aspects of a scene, such as topographical information, may lead to errors that provide less reliable data when deployed in real world conditions.

BRIEF DESCRIPTION OF THE DRAWINGS

Various embodiments in accordance with the present disclosure will be described with reference to the drawings, in which.

DETAILED DESCRIPTION

Figure 1A:
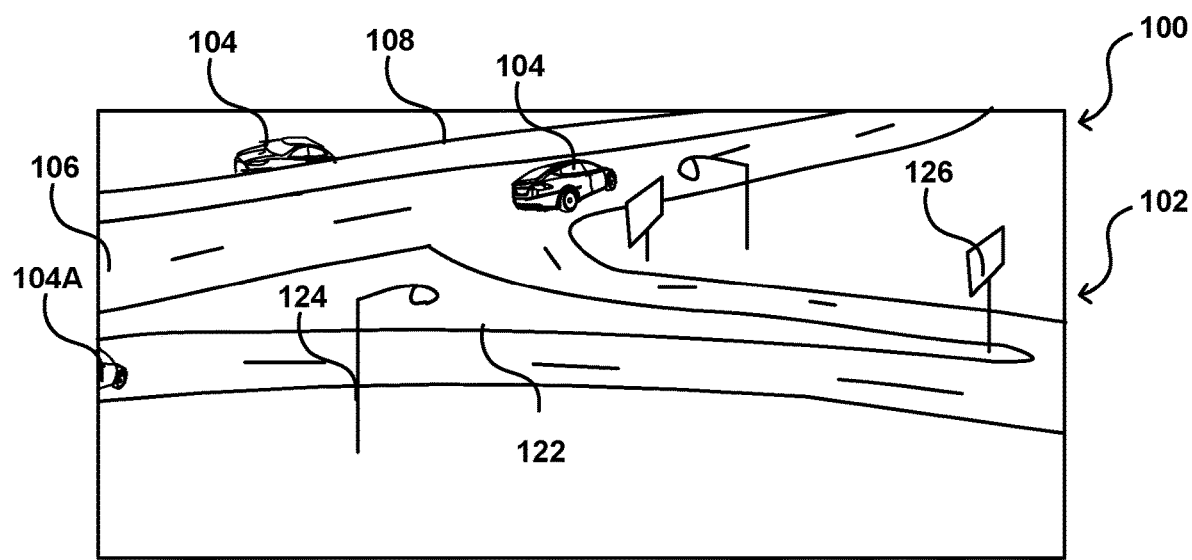
FIGS. 1A and 1B illustrate images for a scene from different perspectives, according to at least one embodiment.

Approaches in accordance with various embodiments provide sensor calibration techniques to translate an image view, such as a flat or depth-less view, into a real world or map view. Sensors can include cameras, such as video cameras, that record one or more different areas from a fixed location. Objects that cross into the fixed location may be recognized, for example using one or more machine learning systems, and then tracked or otherwise observed throughout the scene. Multiple sensors may be fixed onto the same location to provide analytics data, such as monitoring traffic flow in an area. Calibrating these sensors may be challenging because the image data acquired by the sensors may not include depth information. That is, the image data may be substantially flat such that elevational changes are not recorded by the image data. Systems and methods of the present disclosure perform one or more translations from the image space to a geospatial space by use of an established region of interest with boundaries set by one or more anchors or landmarks. FIG. 1A illustrates an example image 100 that may be acquired from one or more sensors, such as an optical sensor corresponding to a camera. The image 100 may correspond to one or more frames from a video feed acquired by the camera, which is arranged at a fixed location corresponding to a geographic location 102 shown in the image 100. In this example, the sensor is obtaining data that may be used for traffic monitoring, but it should be appreciated that various other types of data may be obtained and that embodiments illustrating vehicles on roadways are for illustrative purposes only and not intended to limit the scope of the present disclosure.

As shown in FIG. 1A, various vehicles 104 are driving along a roadway 106 at the geographic location 102. The roadway 106 in this example includes two-lane roads as well as two-directional traffic separated by a barrier 108. In operation, the sensor may acquire the data corresponding to the image 100 and then, using one or more machine learning systems, identify and track the vehicles 104 within the image 100. As an example, a first vehicle 104A may be identified as it comes into the frame and then movement over time may be tracked to monitor traffic flow in the area. Traffic may correspond to how many vehicles use a particular exit, how congested the roadways are at certain times, and the like.

The sensors used are calibrated prior to or after image acquisition such that information can be correlated across a wide variety of sensors and so that the machine learning systems can more readily identify and track the objects. Calibration typically uses sensor properties, which may include intrinsic properties (e.g., resolution, optical center, focal length, etc.) and extrinsic properties (e.g., location, mounting height, mounting angle, etc.) that are used with one or more calibration programs in order to prepare the sensors for use. However, these programs may be challenging for individuals to use and also may not include sufficient information to provide meaningful calibration and validation operations.

Figure 1B:
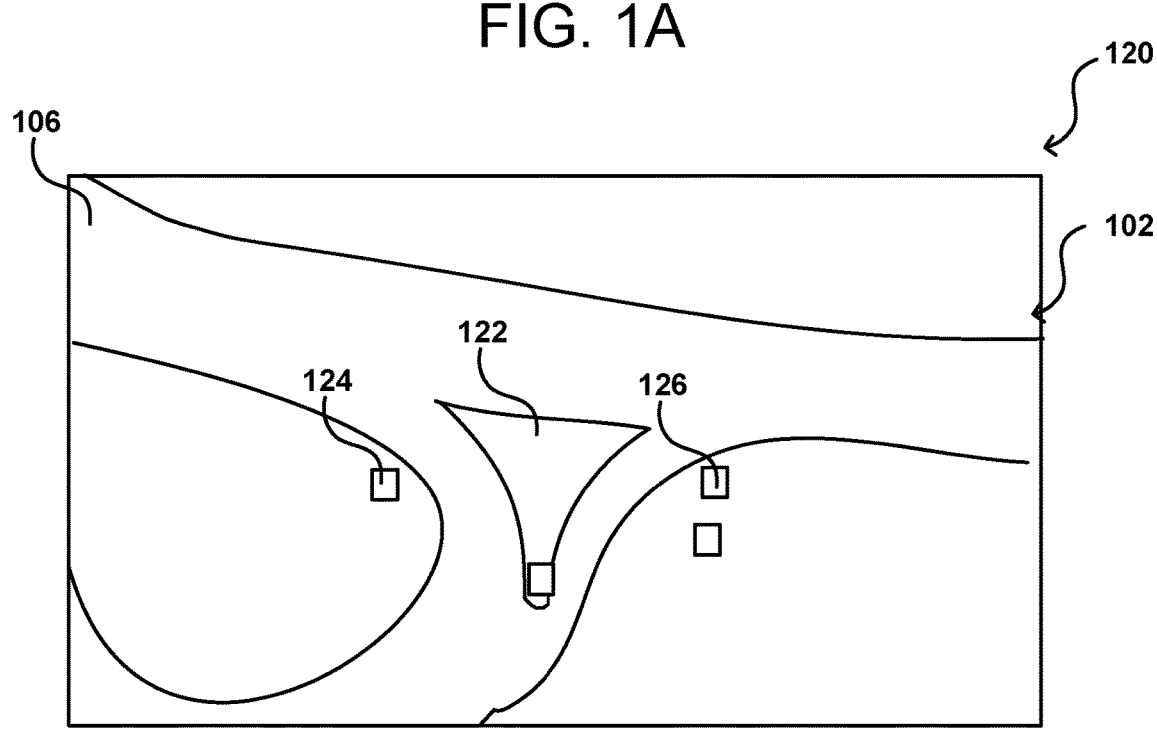

In one or more embodiments, systems and methods of the present disclosure enable translation between the image space shown in FIG. 1A and a geospatial space shown in FIG. 1B in the satellite image 120. In at least one embodiment, the image space may correspond to as a perspective view image while the geospatial space may correspond to as a top down view image or a plan view. It should be appreciated that, in various embodiments, a time that the image 100 is acquired is different from a time when the satellite image 120 is acquired. That is, the objects may not be present on the satellite image 120 due to the difference in time. However, various landmarks or anchors may be positioned between the image 100 and the satellite image 120 in order to correlate different locations or regions. As an example, both the image 100 and the satellite image 120 include the median 122 and different points of the median may be used as anchors in certain embodiments. Furthermore, the streetlights 124 and signage 126 may also be visible in both images 100, 120. These positions, in various embodiments, may be used to draw a region, which may be a polygon, that may then be transformed between the image space and the geospatial space, even though the image space lacks depth information. Such a transformation may be used to quickly and accurately calibrate sensor information without additional, complex procedures.

One or more embodiments of the present disclosure provide an approach for performing sensor calibration suitable for image space to geospatial space translation. According to one or more embodiments, an implementation of the present disclosure may include a graphical tool, which may be referred to as a toolkit, that provides two graphical views displayed on an interface corresponding to a sensor view (e.g., camera or image view) and a geospatial view (e.g., map or satellite view) of a field of view that corresponds, at least substantially, to the same real world location. A user is able to calibrate a transformation from the image space to the geospatial space by drawing a region, which may correspond to a polygon or designated points or lines, in both the image view and satellite views. In one or more embodiments, one or more points on the polygons may correspond to static features in the landscape, which may be correlated in both views. In addition, the user can draw a region of interest where the calibration is desired to be validated. Once drawn, the system computes an initial calibration transformation from an image coordinate frame to a latitude and longitude coordinate frame using, by way of example only, a homomorphic transformation matrix that maps pixels in an image space produced by a camera to pixels in a map or satellite view image. If calibration results in a perceptible inaccuracy at one or more points, for example due to differences in height, the user may manually adjust one or more point in either the image view or the map view, and the revisions are then propagated in the satellite view or the image view for further verification. Repeating for multiple points produces a result that compensates for differences in elevation. Accordingly, systems and methods may be directed toward a simplified calibration technique that enables rapid verification and translation between different viewpoints.

In at least one embodiment, systems and methods are directed toward sensor data that corresponds to video cameras used in smart management of traffic. To perform intelligent video analytics, algorithms or deep learning AI models may be applied to video data captured by the cameras to detect the positions and locations of vehicles in a field of view. This position/location data is often expressed using coordinates of bounding boxes as referenced to image space—e.g., the positions of pixels of an image relative to the corners of the image frame. To perform advanced traffic analysis in real time, this image coordinate system needs to be translated to real world coordinates so the location of the vehicle can be specified using latitude and longitude values. This translation adjusts the pixel scale image data, which may lack information such as size, distance, speed, etc., to information that may be processed by the system. For example, measuring the distance between entities in a frame of a video (e.g., two cars or two people) cannot be achieved with a high degree of accuracy if the coordinates are only in the image plane, but is possible if the coordinates are in the map plane. As an example, additional analytics available in the map plane include measuring a number of cars that cross a virtual trip wire per minute. Each of these measurements can be performed much more accurately in a satellite or map view. However, to translate image coordinates to real world coordinates requires calibration for each camera. This calibration is non-trivial, particularly in multi-camera configuration systems, such as those commonly used at traffic junctions, since the resulting world coordinates derived from each camera need to refer to the same physical location.

Traditional calibration techniques may generate large amounts of error due to faulty assumptions for a flatness or depth information for a road surface. This assumption does not hold true in a real world scenario where road surfaces can change elevations from point to point, even within a localized area. Many other camera calibration procedures assume laboratory conditions not reflected in real road traffic situations, or require additional equipment (e.g. chessboard calibration target) that is not feasible to provide when calibrating hundreds to thousands of traffic cameras. Some methods also require measurement of elevation along the z-axis to be added to the map view of the road system in a city or portion thereof. All the limitations of existing methods also make them difficult to accurately perform by a person who is not a camera calibration expert. Systems and methods of the present disclosure overcome these and other challenges utilizing an interface that enables a user to set anchors, validate a transformation of an area between different viewpoints, and then adjust points until a region of interest for each viewpoint is obtained.

Figure 2A:
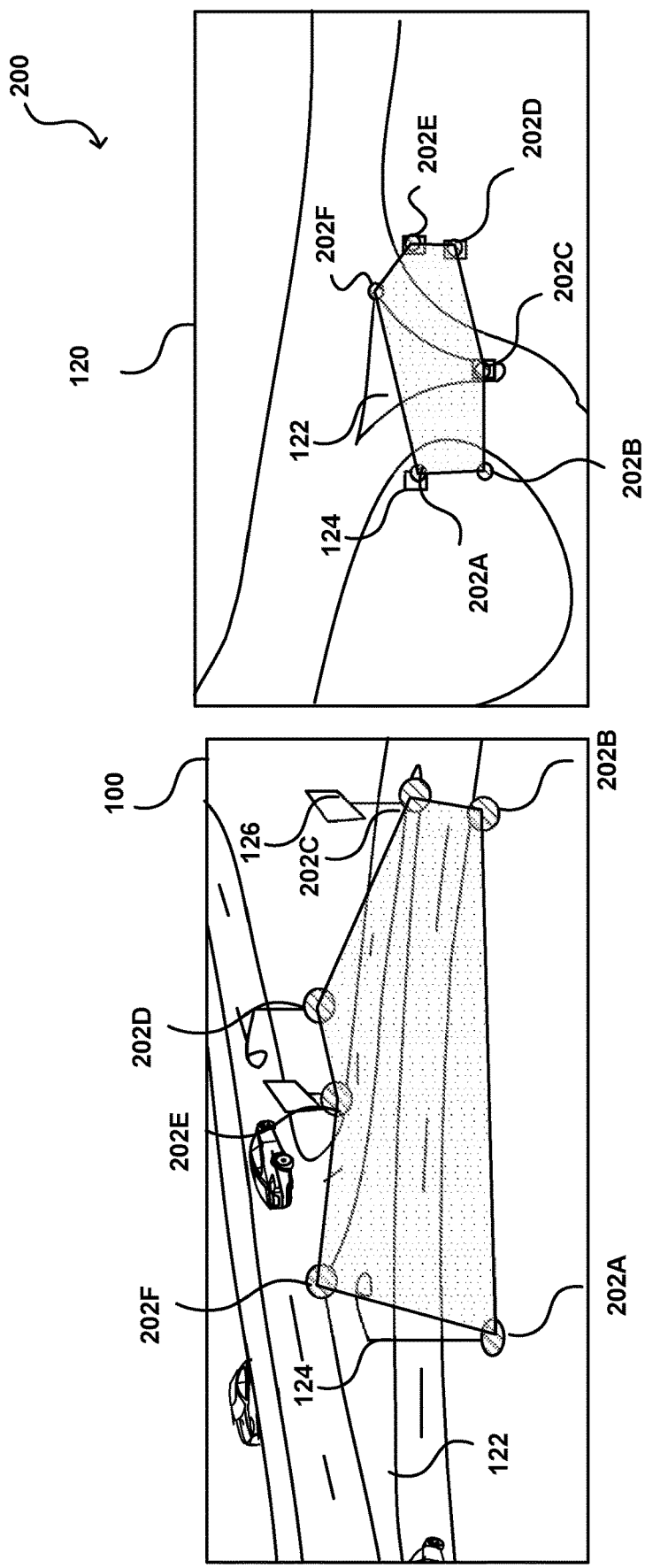
FIGS. 2A-2D illustrate a calibration interface for a pair of images, according to at least one embodiment.

FIG. 2A illustrates a sample calibration interface 200 where the image 100 is utilized for calibration to the geospatial space of the satellite image 120, in accordance with one or more embodiments of the present disclosure. In this example, anchors 202 are positioned along one of the image 100 or the satellite image 120 and then transformed to correspond to a position in the other image. For example, a user may select the anchors 202 on the image 100 and then evaluate their positioning on the satellite image 120. Additionally, in an embodiment, the user may select the anchors 202 on the satellite image 120 and then evaluate their positioning on the image 100. Furthermore, in at least one embodiment, the user may select a portion of the anchors 202 on the image 100 and a portion of the anchors 202 on the satellite image 120. Accordingly, it should be appreciated that the anchors 202 may be set by the user in order to select a region for verification, the region being formed by the anchors 202.

As an operational example, a user may be presented with the image 100 and the satellite image 120 side by side in the calibration interface 200. The user may select various points, such as the median 122, the streetlight 124, and/or the signage 126 to locate anchors 202 for the calibration. In this example, there are six anchors 202A-202F, where the anchors 202A and 202D are positioned to be associated with streetlights 124, the anchors 202C and 202E are positioned to be associated with signage 126, the anchor 202F is associated with the median 122, and the anchor 202B is positioned to correspond to an offset location of the signage 126 associated with anchor 202C. As shown, these anchors 202 may form a region 204 represented by a polygon. It should be appreciated that the polygon is shown by example only and that other embodiments may include different shapes and/or may include line segments that do not form an entire enclosed shape.

Upon receipt of the anchors 202, in one or more embodiments, position location for the anchors 202 are mapped and a homomorphic transformation matrix transforms the locations to associated latitude and longitude coordinates in the satellite image 120. It should be appreciated that the homomorphic transformation may correspond to a structure-preserving map and one or more algorithms, for example algorithms associated with a trained machine learning system, may be used for the transformation. As shown in FIG. 2, the satellite image 120 includes the region 204 and the anchors 202A-202F corresponding to their respective locations, such as the various anchors made with respect to fixed points, such as the streetlights 124. Accordingly, the user may now evaluate and/or review the positioning of the region 204 to determine whether adjustments are necessary.

Figure 2B:
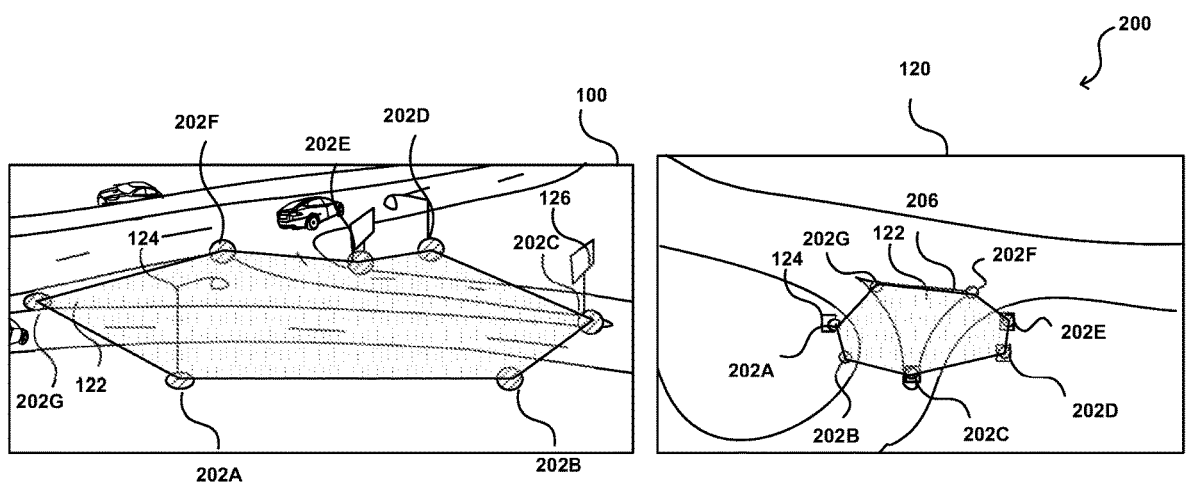

In the example shown in FIG. 2B, the user adjusts a position of anchor 202B and adds anchor 202G. Accordingly, a new region 206 is generated, which when compared to the region 204, includes a larger portion of the median 122 and also more of the entrance to the road to the side of the median 122. In this manner, the user may iterate the desired region, by adding or removing points, or by adjusting locations.

Figure 2C:
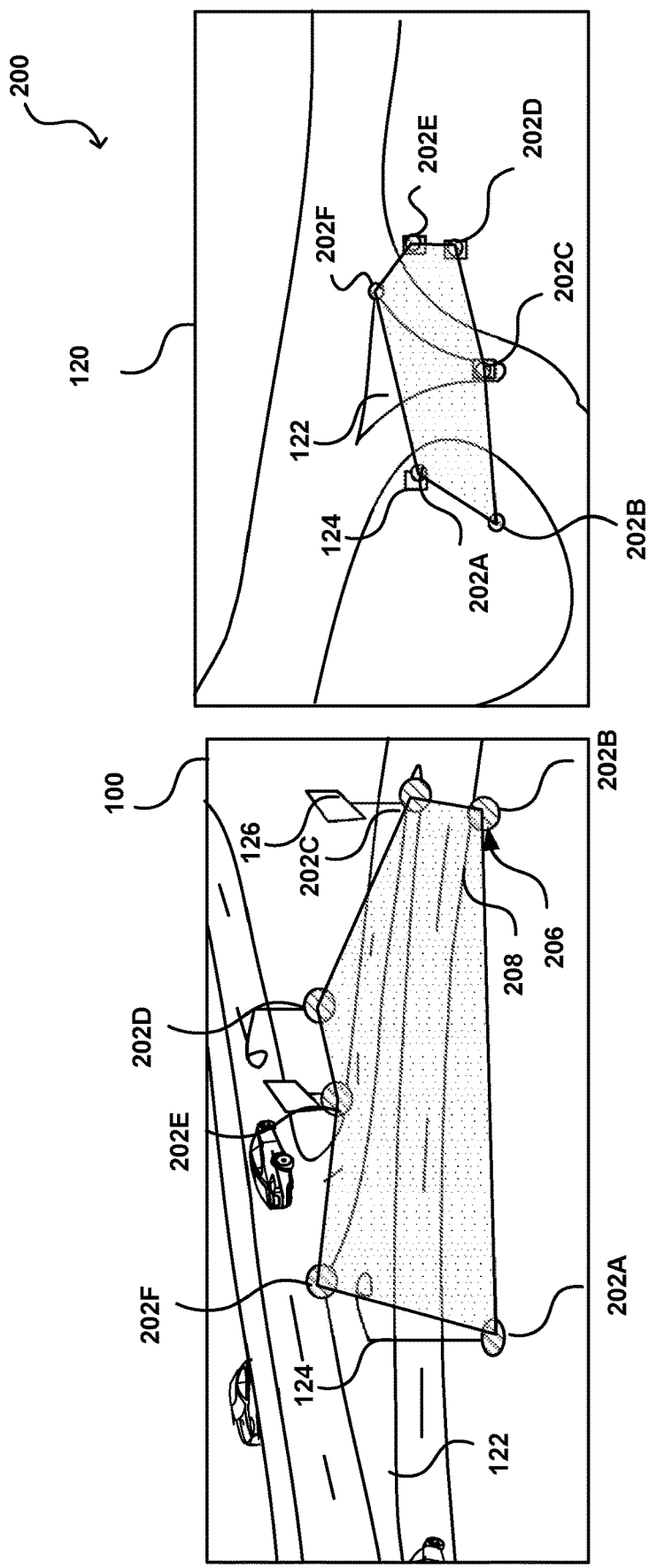
Figure 2D:
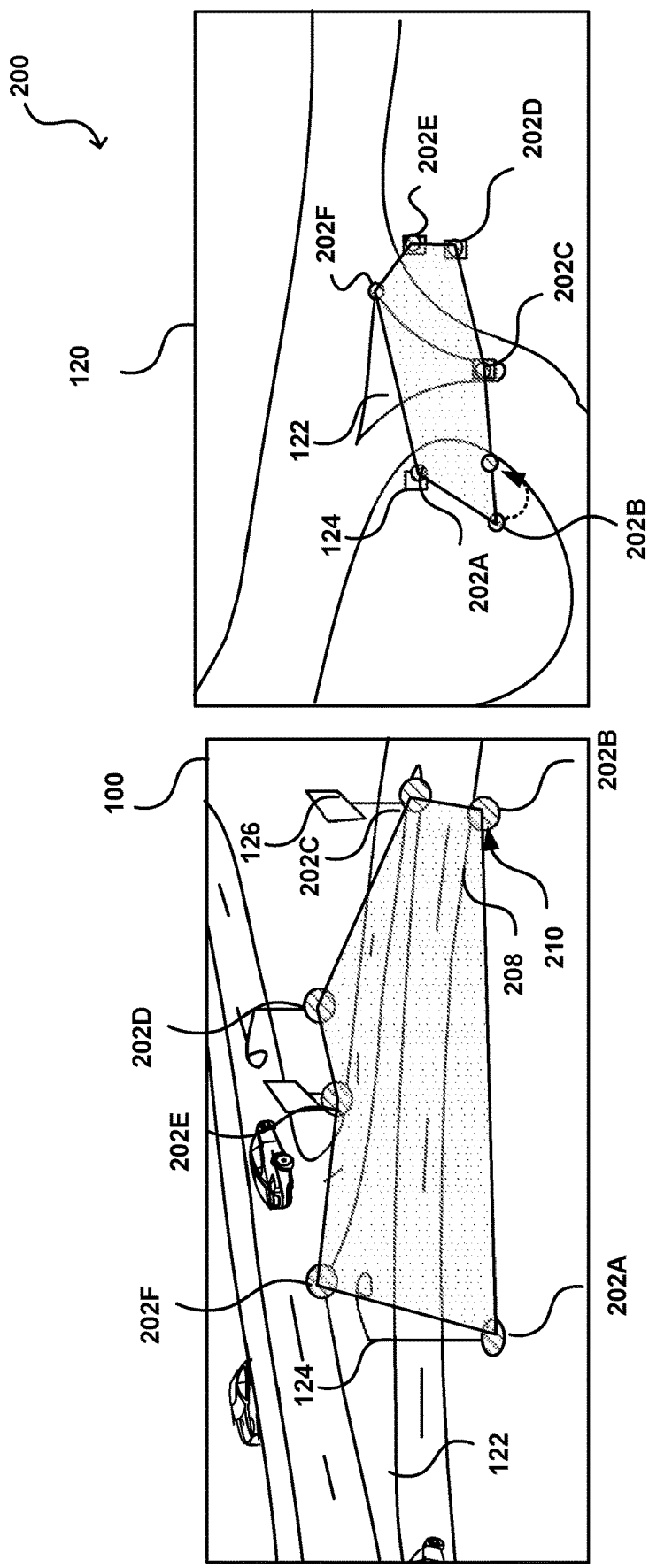

FIGS. 2C and 2D illustrate examples where an initial location for anchor 202B is improper in FIG. 2C and then updated in FIG. 2D. As noted above, the image 100 may lack depth data, and as a result, changes in elevation may not be properly represented. For example, a first location 206 for the anchor 202B may correspond to a hill, where the anchor 202B may appear to be associated with a side 208 of the roadway 106, but when viewed on the satellite view 120, is a distance away from the roadway 106. Accordingly, as shown in FIG. 2D, the user may adjust the position on the satellite view 120 and then have the anchor 202B update on the image 100 to change to a second location 210.

It should be appreciated that while embodiments of the present disclosure refer to user selection of the anchors, in one or more embodiments a machine learning system may be utilized to select the anchors. By way of example, a computer vision machine learning system may evaluate at least one of the image 100 or the satellite image 120 to identify locations for the anchors, which my correspond to trained landmarks such as the signage, light posts, medians, turns, and the like. Thereafter, anchors may be positioned on these points to form a selected region, which the user can verify and adjust.

Figure 3:
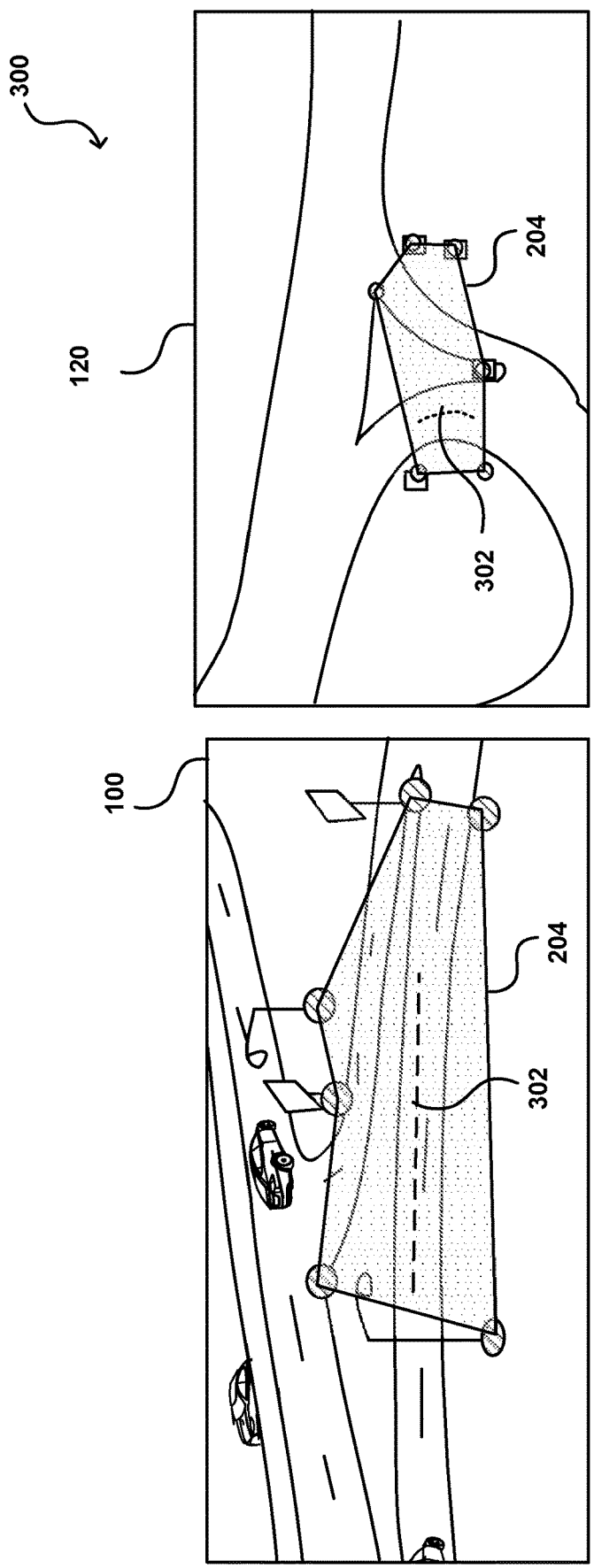
FIG. 3 illustrates a calibration interface for a validation, according to at least one embodiment.

FIG. 3 illustrates a verification environment 300 where a user or a machine learning system may draw a trajectory on at least one of the image 100 or the satellite image 120, in the form of a line or a segment, to verify a location of the trajectory of the other of the image 100 or the satellite image 120. In this example, the region 204 is illustrated as bounded by the anchors 202, where the region 204 is illustrated in both the image 100 and the satellite image 120. In one or more embodiments, the region 204 may have been verified or otherwise reviewed by a user prior to trajectory testing. The user may draw a segment 302 within the region 204, which is then transformed to the opposing image (e.g., drawn in the image 100 and then transformed to the satellite image 120 or drawn in the satellite image 120 and then transformed to the image 100). By checking the segment 302 and the associated trajectory, the user can verify calibration for the region 204. For example, if the segment 302 were to veer into the median 122, the user could determine an error is present and reset the region 204 for improved tracking.

In one or more embodiments, trajectories are tested after the transformation calibration is computed to evaluate the transformation from the image from to the latitude and longitude coordinates of the satellite map. If errors are observed, the user can either shrink the region of interest or make corrections to the calibration by dragging and editing control points (e.g., anchors) of the calibration polygons. Using this method allows even users without significant calibration expertise to be able to draw and edit polygons for calibration and intuitively verify that the calibration is adequate. Limiting calibration within a region of interest simplifies the calibration by excluding those areas that are not of interest from requiring a valid transformation. Areas not within a region of interest may include, for example, the areas outside of drivable paths, or areas that include path-adjacent objects such as trees, bushes, buildings, and other structures. In this way, the system does not need to either assume the road is flat or need to explicitly measure variations in elevation. As a result, more accurate calibrations may be performed with fewer inputs and subsequent testing may be done with fewer resources and time due to the region restrictions.

In one or more embodiments, a calibration can be performed according to a calibration pipeline. A sensor, such as a camera or other sensor, streams sensor data (e.g., image data for a camera), which may be received at a web application. It should be appreciated that streaming data is provided as an example, and in other embodiment data may be evaluated after acquisition, for example data stored on a memory or data uploaded at a later date. An application renders the image data and a satellite map view of the same or substantially overlapping area. Through a user interface (e.g., of the web application), user input is indicative of a defined structure (e.g., a polygon, one or more points, one or more line segments, etc.) in one or both of the rendered image view or the map view. The structure is initially propagated using a transformation matrix to the other of the image or map views. Subsequent revisions corresponding to incremental or iteratively received user input to either of the polygons result in the other polygon being adjusted based on the transformation matrix until the camera is calibrated, that is, until the structure represented in the image is represented as desired in the satellite view.

Figure 4:
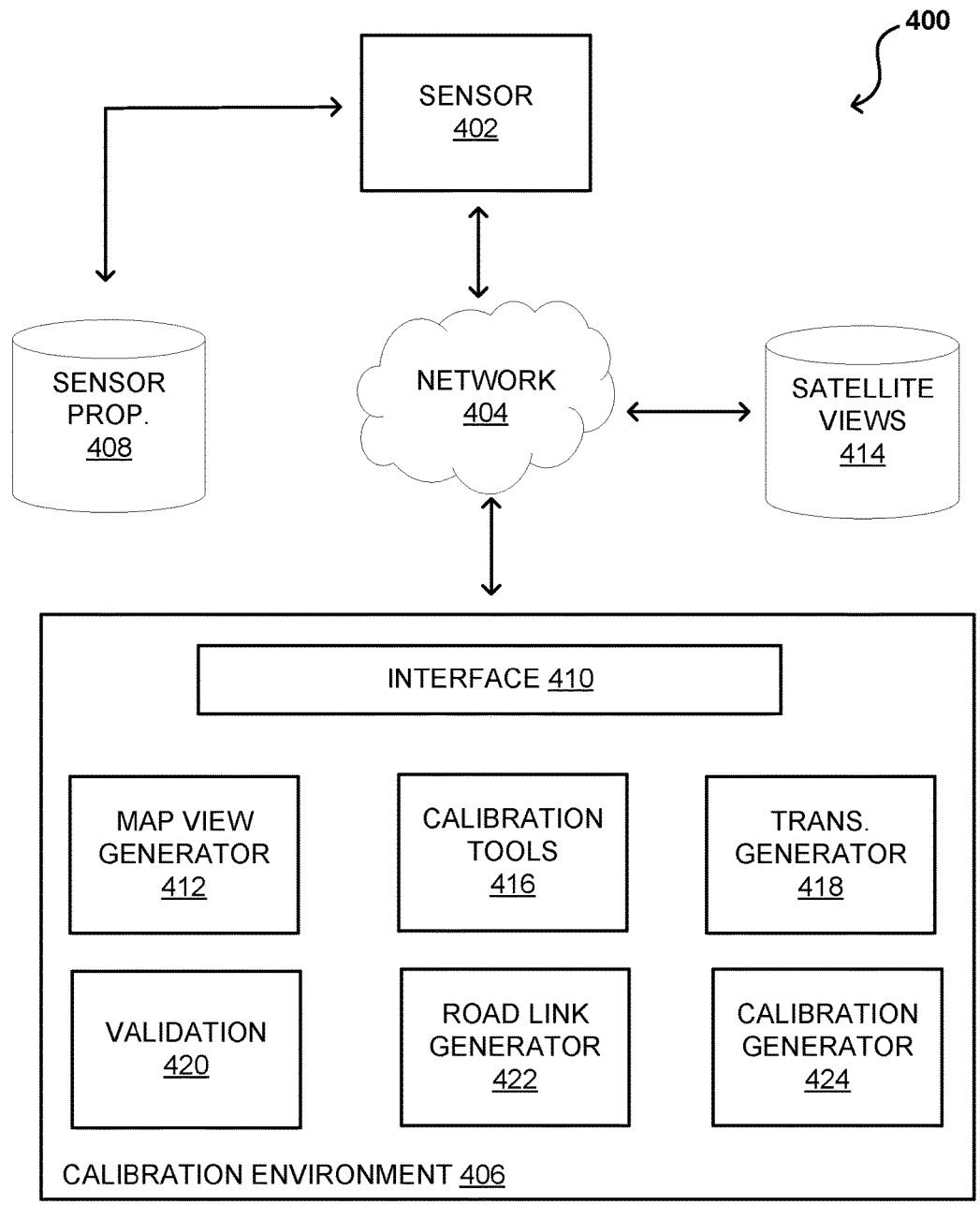
FIG. 4 illustrates a schematic diagram of a calibration system, according to at least on embodiment.

FIG. 4 illustrates a schematic diagram of a calibration environment 400 according to one or more embodiments of the present disclosure. As presented, a sensor 402, such as a camera, may stream or otherwise provide information over a network 404 to a calibration environment 406. It should be appreciated that various features and components are shown as being hosted within the same environment for convenient only and that these systems may be separately hosted or provided, for example with different distributed computing systems. Moreover, additional features or components may also be included, such as support systems, machine learning systems, databases, and the like. The sensor 402 may include a camera, such as a video camera, that obtains image information. The sensor 402 also has certain properties stored within a proper datastore 408, which may correspond to either intrinsic or extrinsic properties. This information may also be provided to the calibration environment 406 for conversion between coordinates in an image space of a bounding box around an object (such as a vehicle) to latitudinal and longitudinal real world coordinates. Extrinsic camera parameters information may include, for example, the position of the camera (e.g., camera height, latitudinal and longitudinal coordinates, etc.). Intrinsic camera parameters may include properties of the camera assembly, including, for example, a sensor size, focal length, etc.

An interface 410 is included to receive and direct the information to appropriate locations. The interface 410 may include be an API that a user may gain access to, for example via an authorized account, to perform calibration on one or more sensors. In at least one environment, the environment 406 includes a map view generator 412, which may communication with a satellite views datastore 414 to obtain the map or satellite images described herein. The satellite views datastore 414 may be separately hosted, for example by a third party, and provide information on command when presented with a request that includes information associated with a region, such as an address or coordinates.

In at least one embodiment, the environment 406 may be used to generate a user interface that receives one or more inputs from a user. As noted above, the interface may provide a side-by-side or otherwise coordinated appearance between an image from the sensor and a satellite view corresponding to substantially the same geographic location. The interface may also receive inputs, such as inputs generated by a calibration tools generator 416. Calibration tools may include elements that enable users to interact with the images within the user interface, such as tools to zoom or scroll. Additionally, the calibration tools may include the anchor points or tools to draw line segments. Accordingly, a user may be presented with a user interface and a set of tools for providing inputs for processing, such as a set of anchor points that may be connected into a polygon to form a region of interest for calibration.

In at least one embodiment, a transformation generator may develop one or more matrixes to translate pixel locations from the image file to geospatial locations with latitude and longitude coordinates to a satellite or map view. In one example, a homomorphic transformation matrix is generated to map locations of anchors and/or segments between images. In one or more embodiments, a machine learning system may be trained to generate the homomorphic transformation. The homomorphic matrix may be in the form of N×N with a fixed number of parameters. In various embodiments, each parameter may be adjusted by adding a value (a reprojection error), represented by $\varepsilon$. This provides for error correction to each parameter, and by using embodiments the present disclosure, the value of c may be decreased for each particular case. Accordingly, noise in the equations may be reduced by applying the reprojection error. Transformations may be provided in both directions, that is, from the image to the satellite view and from the satellite view to the image view. Accordingly, users may provide refinements or changes to either of the images and have the resultant changes provided to the other figure.

A validation module 420 may be used to generate one or more trajectories to validate a calibration model. For example, a user may add a trajectory in the form of a line segment, or other type of simulated movement or object, into the calibration model. The trajectory may then be translated to the other picture (e.g., either the image or map view) for review by the user. The user may determine whether the trajectory is aligned with an expected location, and if not, the user may refine the region of interest to obtain an improved calibration. In one example, the trajectory may include a line segment simulating an expected path for an automobile and translation may draw the expected path onto the other image. If the user determined that the expected path veered off the roadway in one image, then the user may adjust or otherwise change the calibration for the region.

One or more embodiments also include a road link generator 422, for example in embodiment where the sensor is a camera and the calibration is associated with traffic monitoring. The road link generator 422 may identify different segments of a road and determine driving directions for the road (e.g., one way, two way, etc.) for improved identifications and mapping. For example, certain segments may have an added flow, representative of two-way traffic, with others only have a single segment. This may be associated with a road network, which may be in the geospatial space, that represents traffic flows and general road usage within an area. Additionally, information may be utilized with autonomous or semi-autonomous vehicles.

Systems and methods of the present disclosure may also include a calibration generator 424, which may be used to develop a mapping between a particular image, at a certain location, with a satellite or map view. The direct mapping (e.g., a polygon formed by connecting anchors) for a particular camera may be stored for later use. In one or more embodiments, the polygons or identified region may be stored individually for each of the input image and for the satellite or map view. The mapping may include coordinates (e.g., GPS coordinates, latitude and longitude, etc.) for a particular calibrated region. The stored calibration may be accessed when particular portions of a feed are processed, for example portions associated with the camera, and then utilized for data collection and evaluation.

Various embodiments of the calibration environment may be associated with, or form at least a portion of, a workflow to calibrate one or more sensors, which may correspond to cameras as noted herein. A first portion of the workflow may correspond to a set of user inputs. These inputs may include sensor information, as noted above, such as GPS coordinates of the sensor, sensor resolution, or other sensor location data (e.g., an intersection). Additionally, an input may further include the image that is utilized for the calibration. A second portion of the workflow may correspond to one or more steps associated with the calibration environment 406, such as using the calibration tools 416 and the translation generator 418 to generate the regions between a camera image and a satellite or map image. Moreover, the translation may be verified, either automatically or by the user, to develop the polygons or regions associated with the calibration. This information may then be stored, such as metadata associated with the image data, to enable use with a network of products, such as a road network. Information may then be exported as an appropriate format for use with one or more applications.

In one or more embodiments, calibrations may be utilized and exported to various tools that may be associated with groups of sensors for managing or otherwise monitoring areas. In at least one embodiment, calibrations may be exported to a traffic management tool that coordinates multiple cameras to monitor and regulate traffic flow within an area, where the road link generator 422 may be utilized to determine and establish normal traffic flows (e.g., direction of travel) within the regions, among other features.

Embodiments of the present disclosure may provide a simplified calibration procedure that also utilizes fewer resources. For example, systems and methods are no longer corresponding individual pixels between the image space and the geospatial space, but rather, evaluating only the identified polygon associated with the anchors. Moreover, systems may focus calibrations on specific identified regions in order to reduce unnecessary processing while also providing improved calibrations over specifically identified regions.

Moreover, as described herein, embodiments are not limited to roads or cameras utilized to monitor traffic flow. As an example, sensors may be used to identify walking paths, for example within a factory setting, along a nature trail, along a public sidewalk, at an event, and the like. In a factory setting, for example, walking paths may be mapped in order to develop locations to position barriers to keep workers a desired distance away from operating machinery.

Moreover, with respect to a nature trail, additional resources may be deployed for particularly busy trails or in areas where users are seen deviating from the path, which may be indicative of an opportunity to provide additional walking paths or illustrate areas where repairs are needed. Furthermore, embodiments may be used with cartesian coordinates, rather than an input geospatial coordinate, where a user imports their own coordinate system. In at least one embodiment, a blueprint or a CAD drawing may be used as a defined coordinate system that acts as the geospatial space.

Figure 5:
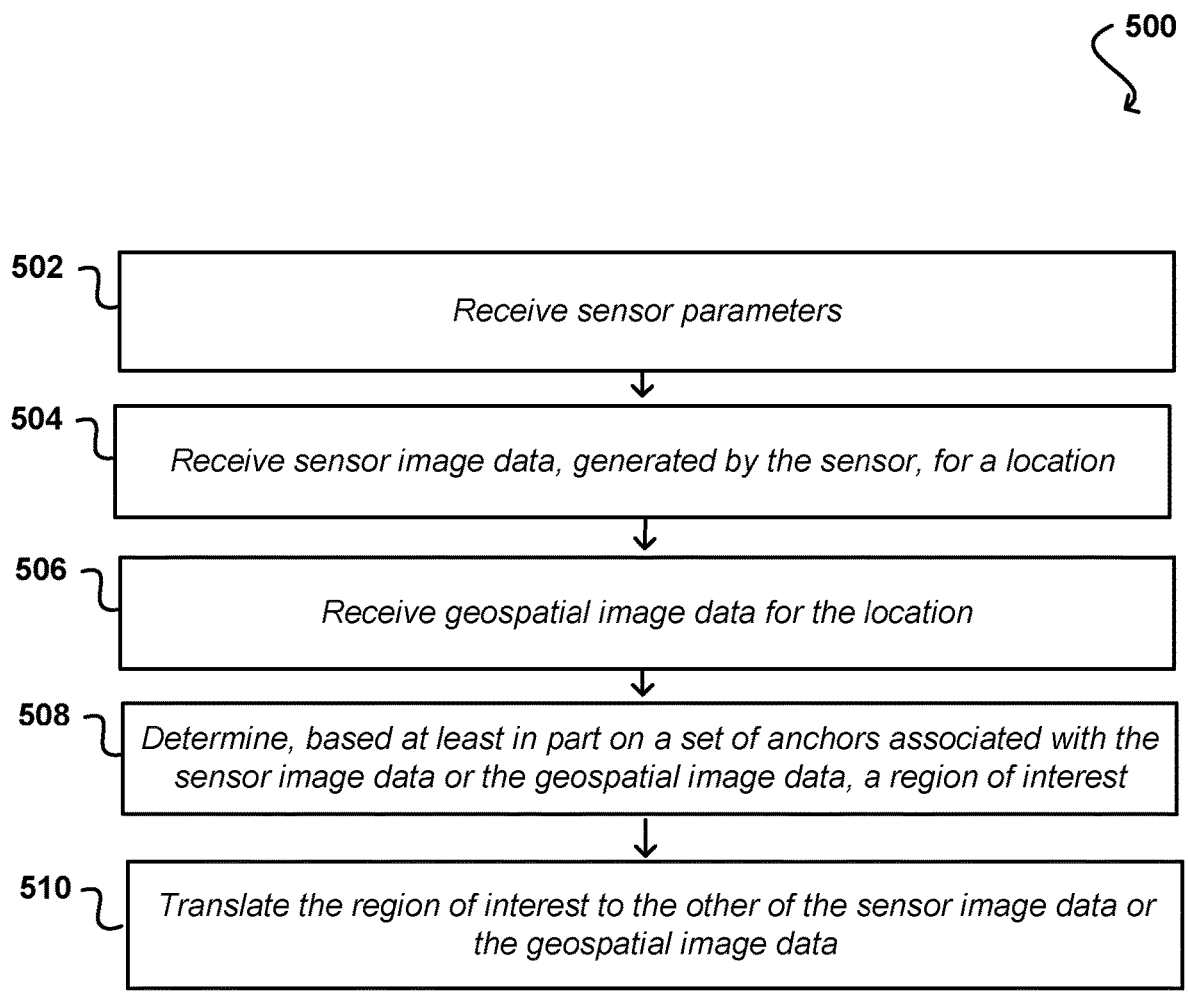
FIG. 5 illustrates an example process for calibrating a sensor, according to at least one embodiment.

FIG. 5 illustrates an example process 500 for calibrating a sensor. It should be understood that for this and other processes presented herein that there can be additional, fewer, or alternative steps performed in similar or alternative order, or at least partially in parallel, within scope of various embodiments unless otherwise specifically stated. In this example, sensor parameters are received 502. As noted above, the sensor parameters may include both intrinsic and extrinsic parameters. In at least one embodiment, the sensor is a camera, such as a video camera, but various embodiments may also utilize other types of sensors. Sensor image data for a location is received 504. For example, in embodiments where the sensor is a camera, the sensor image data may include a picture or a frame of a video for a location corresponding to a mounting location for the camera. Geospatial image data for the location is also received 506. In at least one embodiment, the geospatial image data corresponds to a map or satellite view of the location, which may include information such as GPS coordinates and/or latitude and longitude coordinates for various portions of the location.

In at least one embodiment, a set of anchors may be associated with the sensor image data and/or the geospatial image data to determine a region of interest 508. In at least one embodiment, the set of anchors are input by a user. In at least one embodiment, the set of anchors is generated by one or more machine learning systems, such as a trained computer vision system that identifies one or more landmarks within the images. The region of interest my be provided with respect to one of the sensor image or the geospatial image, and therefore, may be translated to the other of the sensor image or the geospatial image 510. This translation enables verification of the location of the region of interest from at least two different perspectives.

Figure 6A:
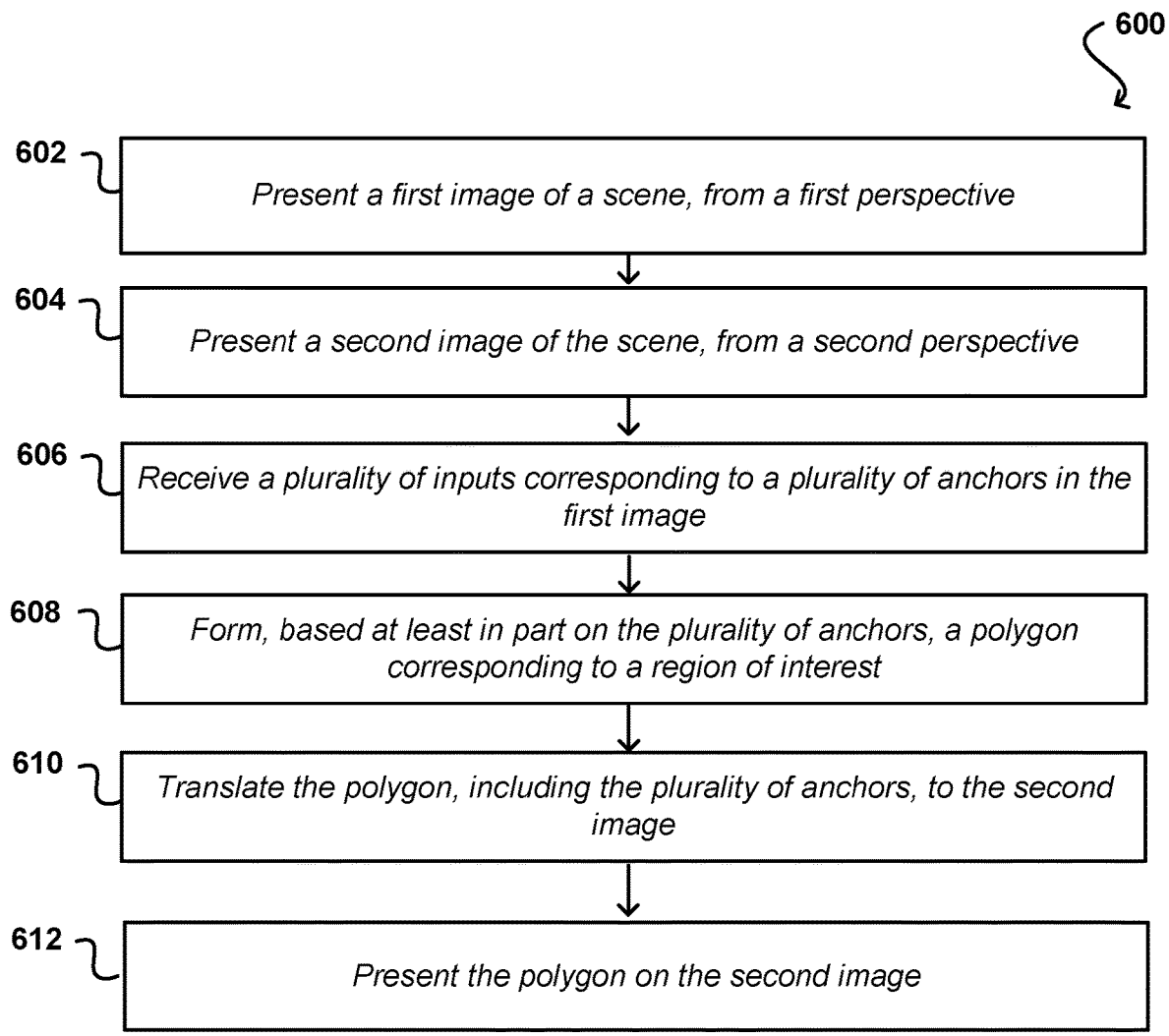
FIG. 6A illustrates an example process for calibrating a sensor, according to at least one embodiment.

FIG. 6A illustrates an example process 600 for calibrating a sensor that produces image data. In one or more embodiments, calibration may be conducted through a user interface provided for calibrating one or more cameras. The user interface may present a first image of a scene from a first perspective 602. In one embodiment, the first image may be an image received from the image sensor. The user interface may also present a second image of the scene from a second perspective 604. For example, the second image may be from a different perspective and be a different type of image, such as map or satellite image of the scene. A user, interacting with the interface, may position a plurality of inputs corresponding to a plurality of anchors 606. The anchors may be used to form a region of interest, which may be a polygon connecting the anchors together 608. In at least one embodiment, the polygon is translated to the second image 610. For example, a polygon formed by selecting points on the first image may be correlated to the second image, such as by using a homomorphic matrix. The polygon is then presented to the user on the second image 612. Accordingly, the user may interact with the interface to receive rapid validation of calibration information without specialized skills or information.

Figure 6B:
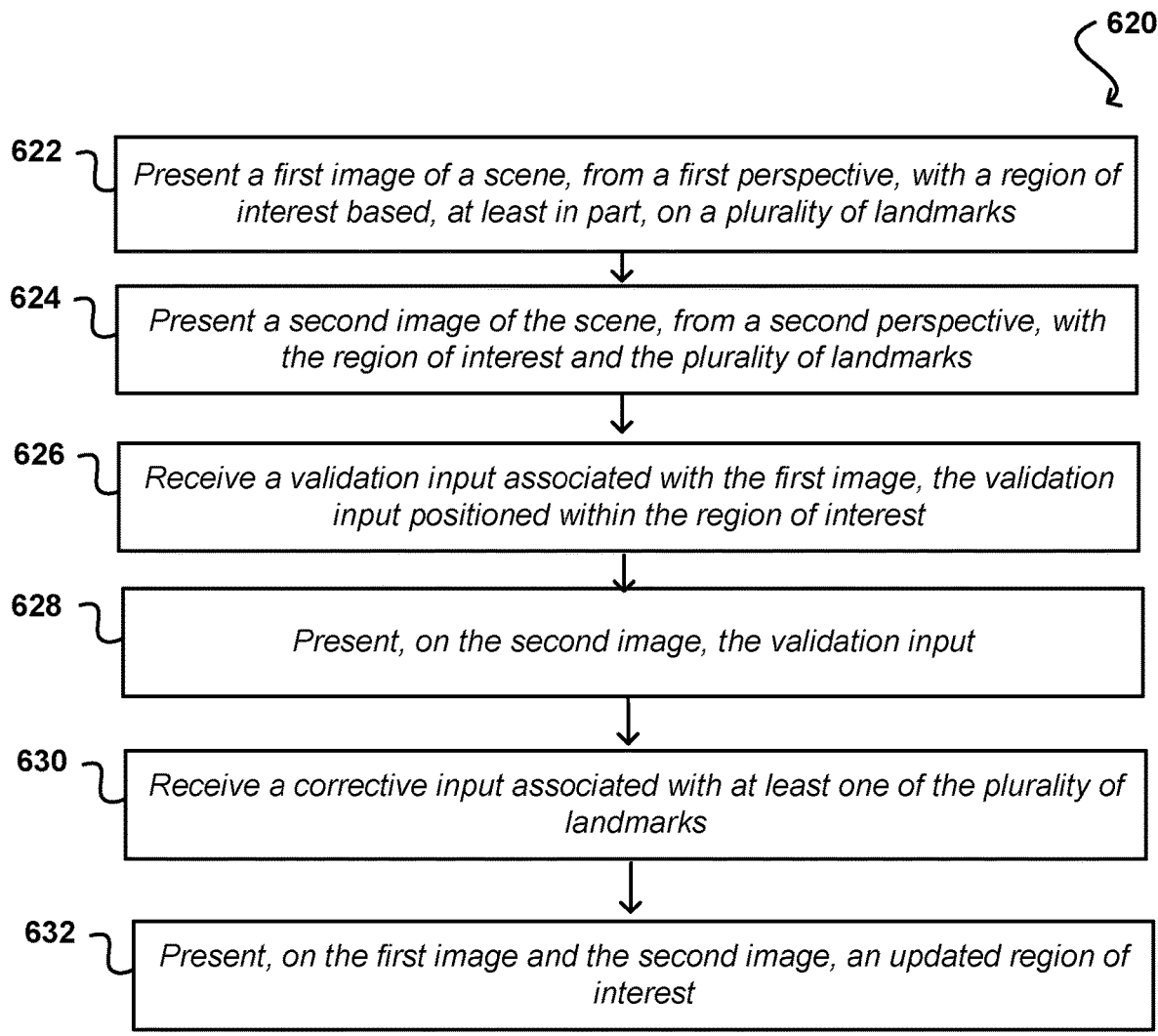
FIG. 6B illustrates an example process for validating a calibration of a sensor, according to at least one embodiment.

FIG. 6B illustrates an example process 620 for calibrating an image sensor. In one or more embodiments, an interface may be utilized to present information to a user. A first image for a scene is presented 622. In at least one embodiment, a region of interest is associated with the first scene and includes a plurality of landmarks. A second image for the scene is presented 624, wherein the second image also includes the region of interest and the plurality of landmarks. In at least one embodiment, a validation input is received with respect to the first image 626. The validation input is then presented on the second image 628. In at least one embodiment, a correction input is received associated with at least one of the plurality of landmarks 630. For example, the correction input may adjust or move a position of at least one of the landmarks. Responsive to the correction input, an updated region of interest is presented on the first and second images 632.

Data Center

Figure 7:
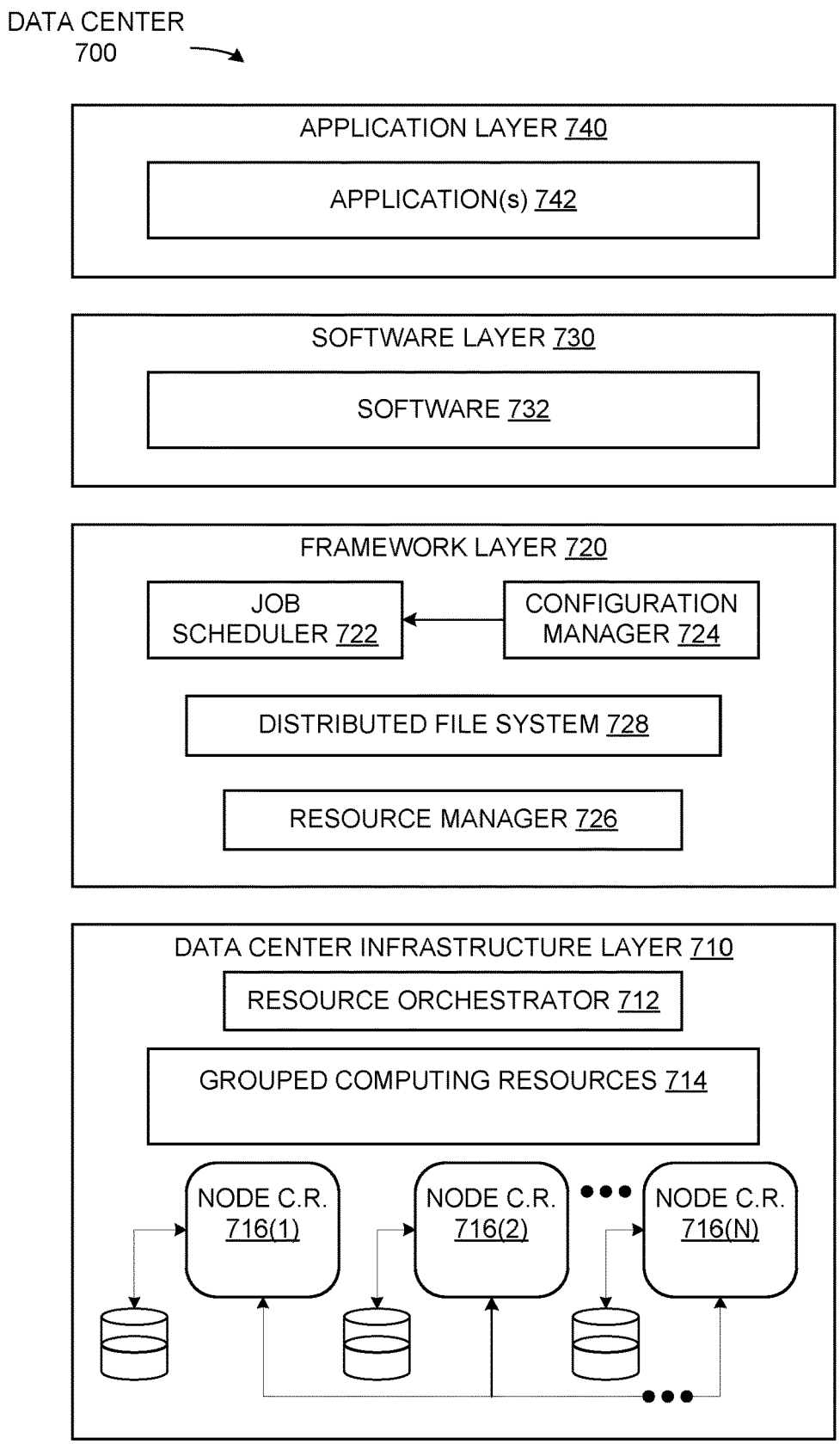
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used for sensor calibration.

Computer Systems

Figure 8:
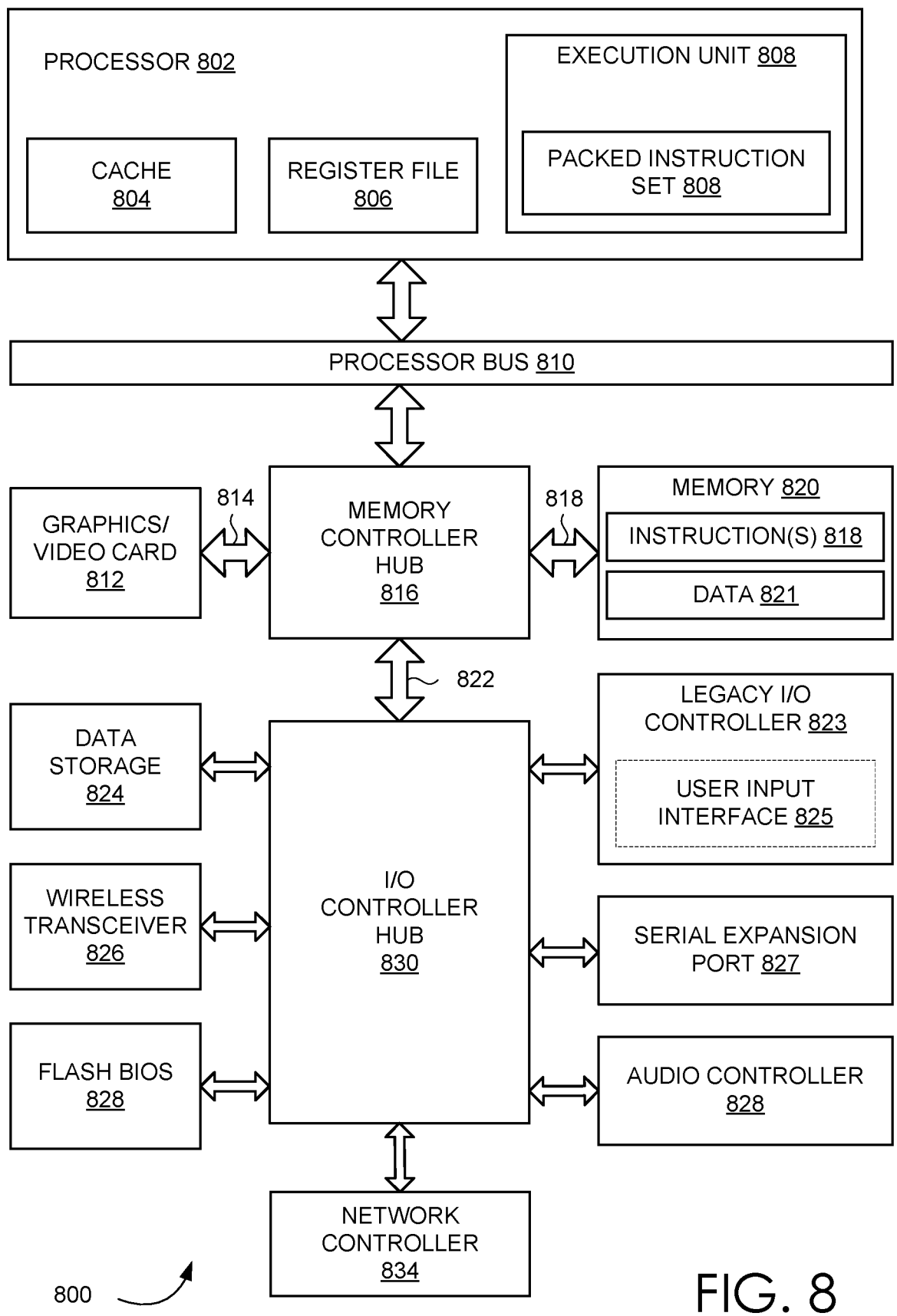
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), edge computing devices, set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Such components can be used for sensor calibration.

Figure 9:
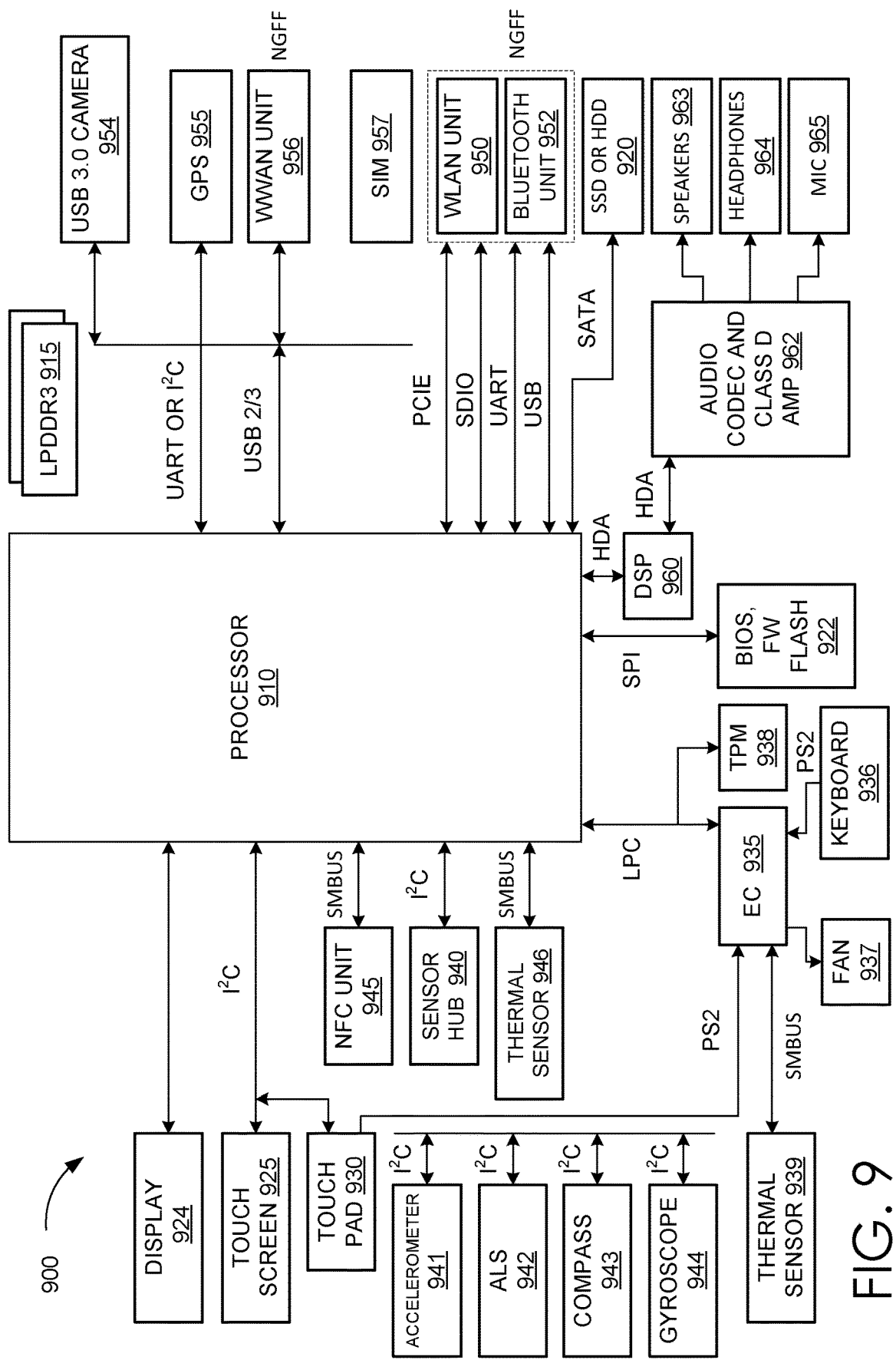
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used for sensor calibration.

Figure 10:
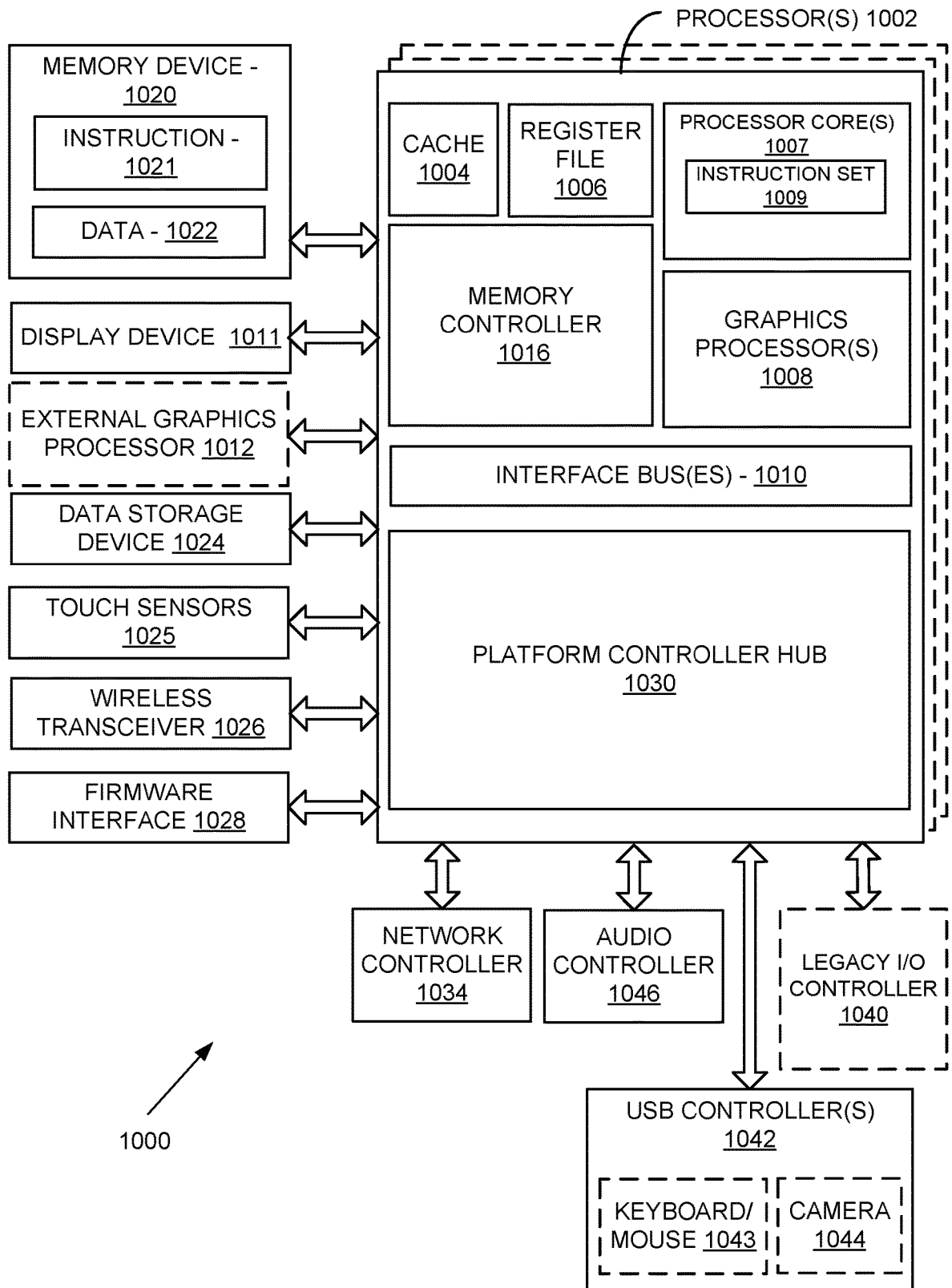
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system or datacenter having a large number of collectively or separably managed processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a cloud computing host platform, a virtualized computing platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, edge device, Internet of Things ("IoT") device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used for sensor calibration.

Figure 11:
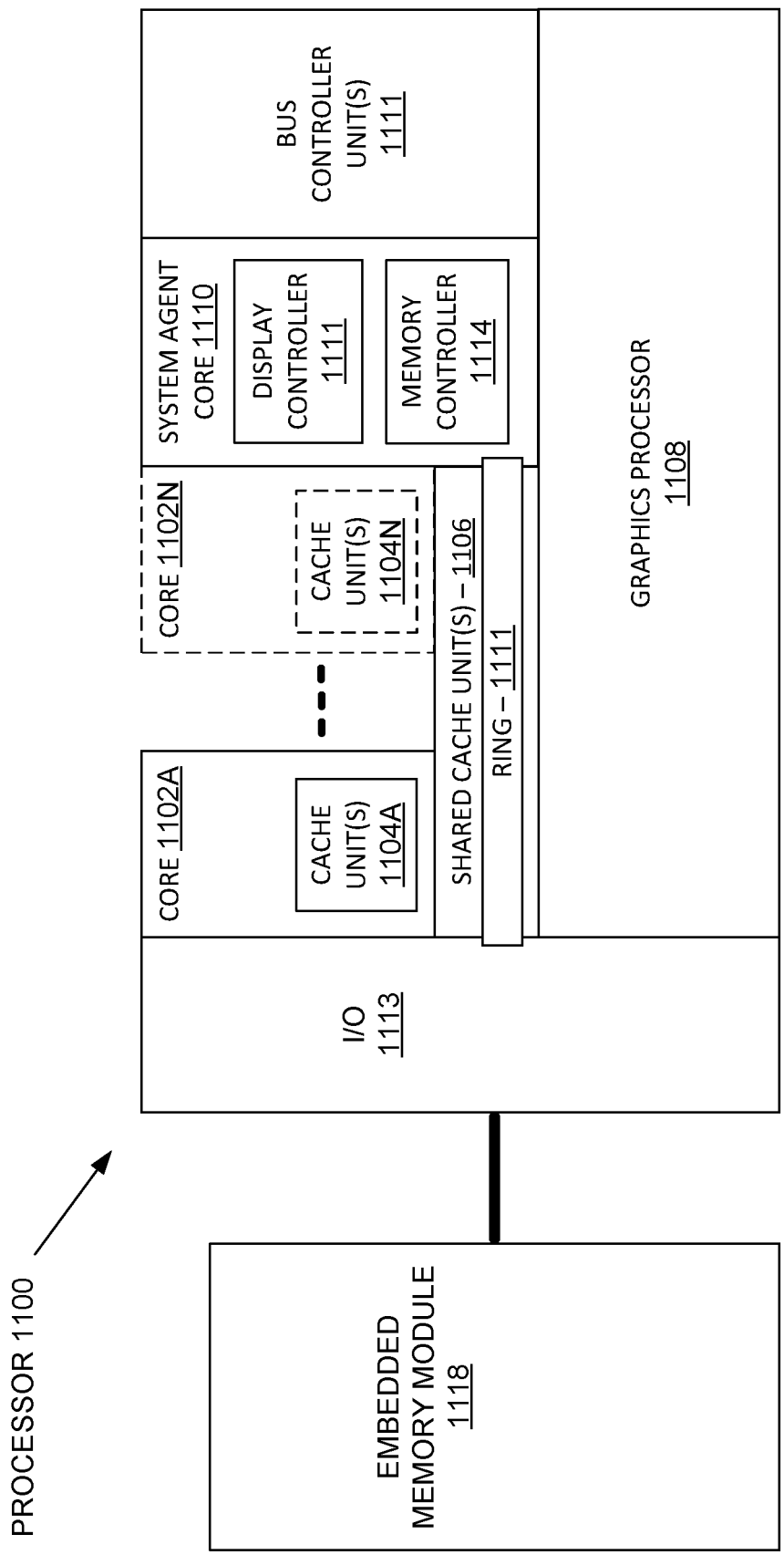
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used for sensor calibration.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors - for example, a non-transitory computer-readable storage medium store instructions and a main central processing unit ("CPU") executes some of instructions while a graphics processing unit ("GPU") and/or a data processing unit ("DPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be any processor capable of general purpose processing such as a CPU, GPU, or DPU. As non-limiting examples, "processor" may be any microcontroller or dedicated processing unit such as a DSP, image signal processor ("ISP"), arithmetic logic unit ("ALU"), vision processing unit ("VPU"), tree traversal unit ("TTU"), ray tracing core, tensor tracing core, tensor processing unit ("TPU"), embedded control unit ("ECU"), and the like. As non-limiting examples, "processor" may be a hardware accelerator, such as a PVA (programmable vision accelerator), DLA (deep learning accelerator), etc. As non-limiting examples, "processor" may also include one or more virtual instances of a CPU, GPU, etc., hosted on an underlying hardware component executing one or more virtual machines. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
    transmitting data causing a presentation of a first image of a scene, taken from a first static perspective corresponding to a first sensor used to obtain the first image;
    transmitting data causing a presentation of a second image of the scene, taken from a second perspective corresponding to a second sensor used to obtain the second image;
    receiving a plurality of inputs, selected by a user via an interface, corresponding to a plurality of landmarks in the first image that are also depicted in the second image, the plurality of inputs forming a static polygon defining a static calibration region including one or more elevation changes within the static calibration region between the first static perspective and the second perspective;
    translating the static polygon, including the plurality of landmarks, to the second image using a homomorphic translation matrix; and calibrating, for the static calibration region defined by the static polygon, the first sensor based on the translated static polygon in the second image.

2. The computer-implemented method of claim 1, further comprising:
    receiving a correction input corresponding to the second image, the correction input directed toward at least one landmark of the plurality of landmarks;
    updating, responsive to the correction input, an appearance of the static polygon on the second image; and
    updating, responsive to the correction input, an appearance of the polygon on the first image.

3. The computer-implemented method of claim 1, further comprising:
    receiving a validation input corresponding to the first image, the validation input including one or more calibration landmarks forming a segment;
    translating, onto the second image, the segment; and
    receiving a confirmation of a position of the segment.

4. The computer-implemented method of claim 3, further comprising:
    determining a position of the segment is outside of a range; and
    correcting one or more of the plurality of landmarks to change a shape of the polygon.

5. The computer-implemented method of claim 1, further comprising:
    receiving properties for a first sensor associated with acquiring the first image; and
    generating a calibration file, based at least in part on the properties and the static polygon.

6. The computer-implemented method of claim 5, wherein properties for the first sensor correspond to at least one of a sensor resolution, an optical center, a focal length, a first sensor location, a first sensor mounting height, or one or more first sensor coordinates.

7. The computer-implemented method of claim 1, wherein the first image and the second image are acquired at different times.

8. The computer-implemented method of claim 1, further comprising:
    providing the interface including the first image and the second image, the interface positioning the first image and the second image in a common viewing window, and the interface including one or more tools for establishing the plurality of landmarks.

9. The computer-implemented method of claim 1, wherein the first image is a camera image and the second image is a satellite image.

* * * * *